Patented Sept. 20, 1927.

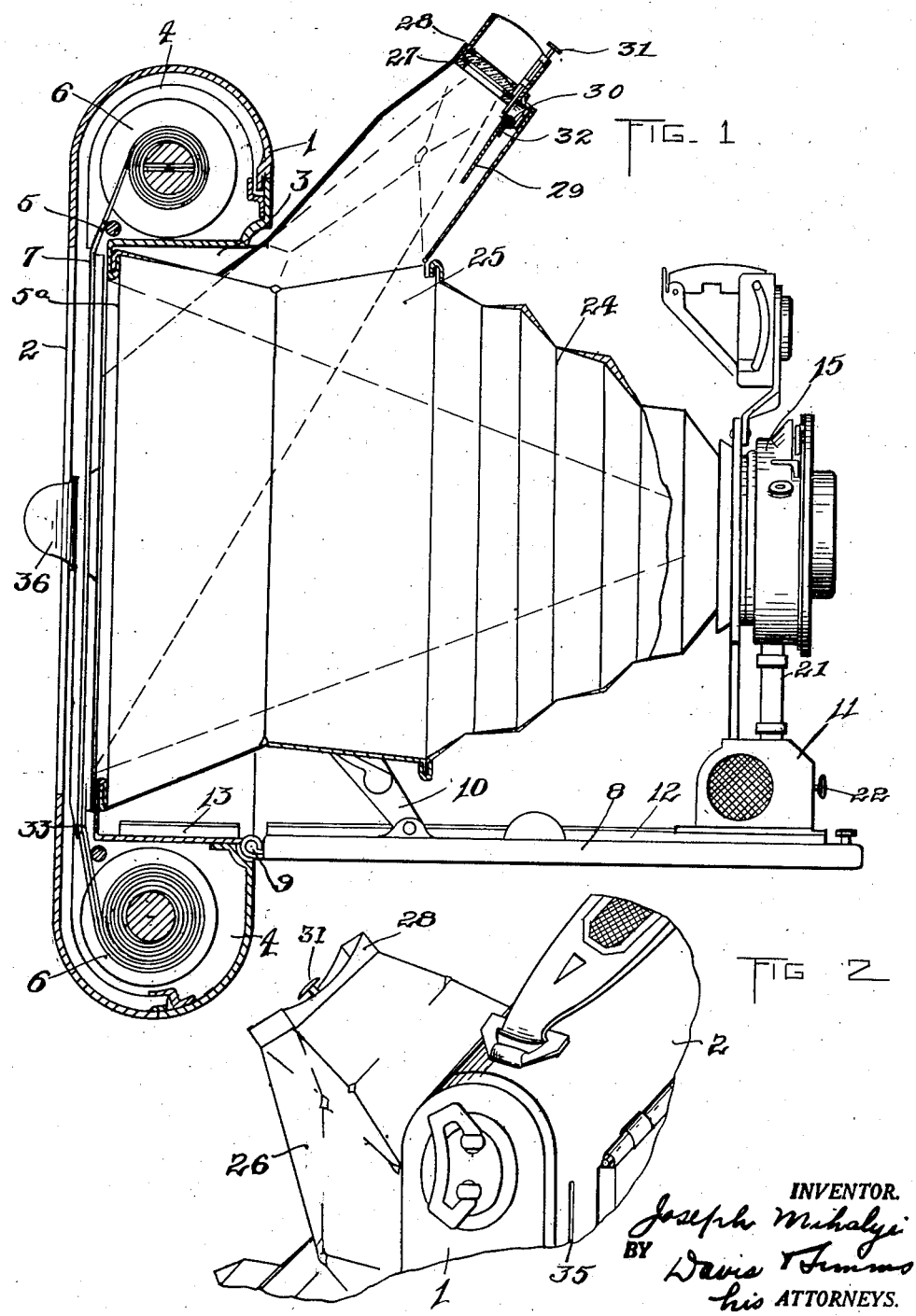

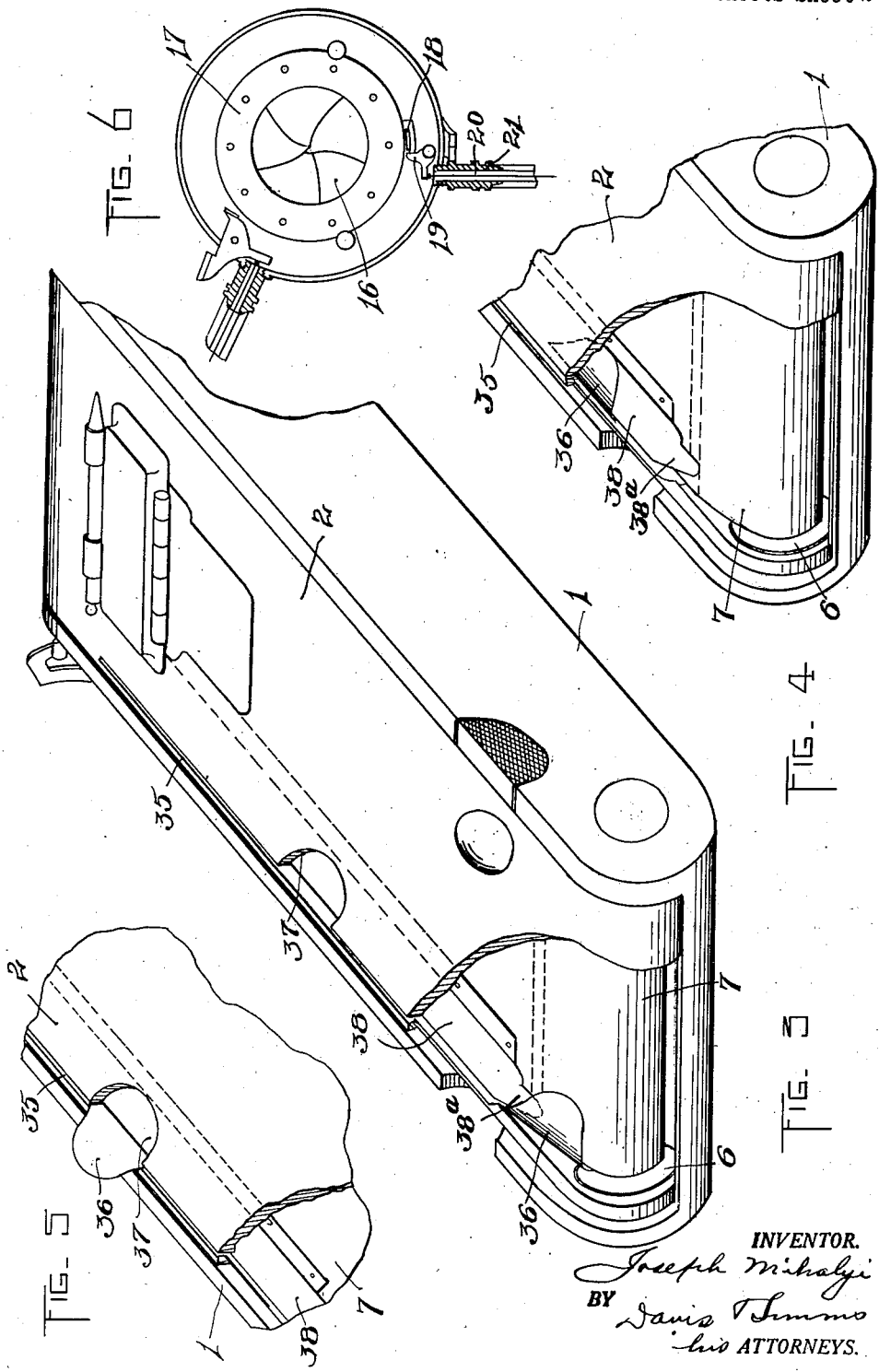

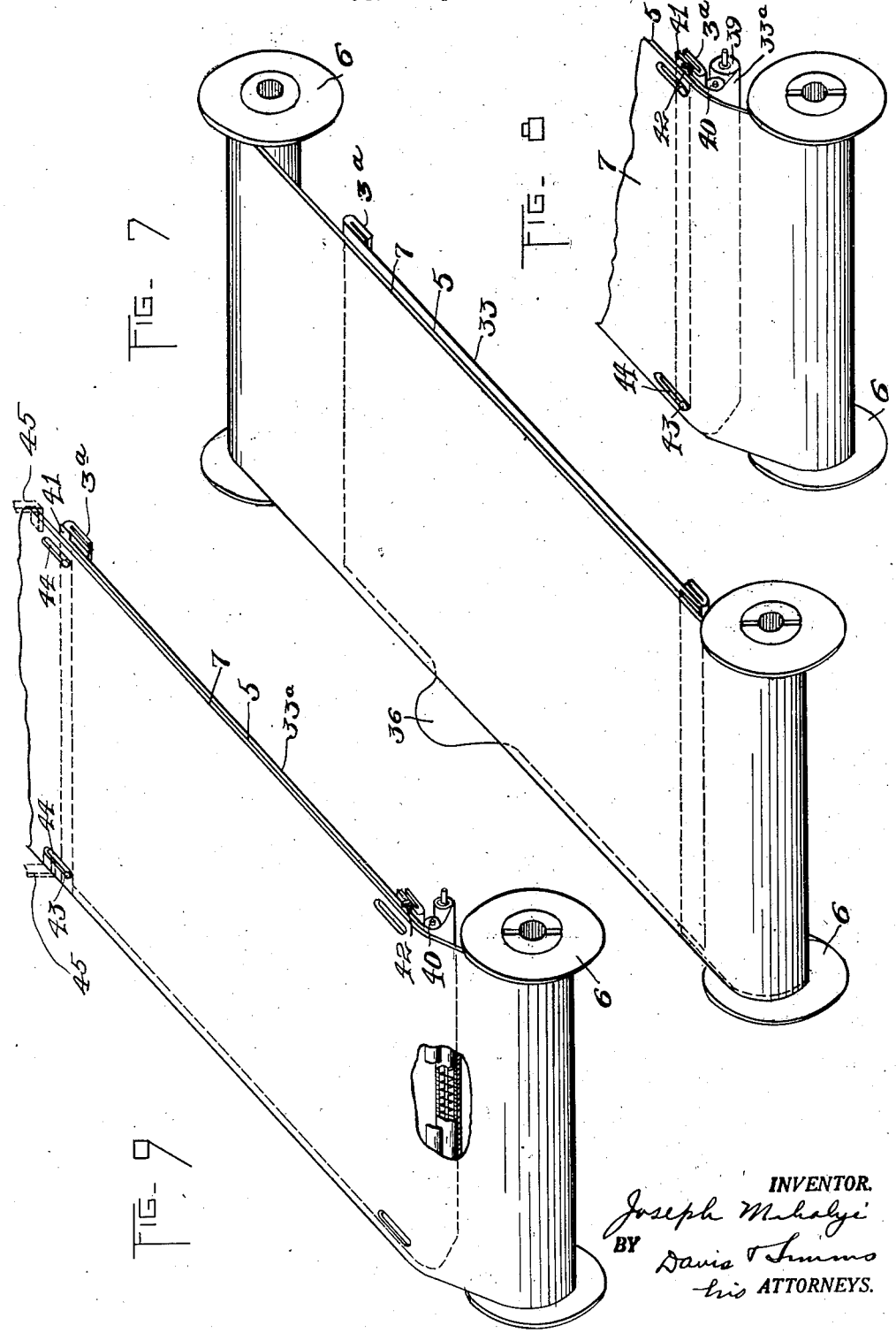

1,642,935

UNITED STATES PATENT OFFICE.

JOSEPH MIHALYI, OF WASHINGTON, DISTRICT OF COLUMBIA.

PHOTOGRAPHIC CAMERA.

Application filed May 10, 1920. Serial No. 380,100.

The present invention relates to photographic cameras and more particularly to the type in which a focusing screen is used in connection with the sensitized element for the purpose of focusing the image before exposure of the sensitized element, an object of this invention being to provide a focusing means which will be simple in operation and which will also not require any operation for effecting the relative movement between the lens and the sensitized element after the focusing has taken place. Still another object of the invention is to provide a focusing screen which will shift to focusing position with the shifting of the sensitized element to exposing position and which will be movable away from focusing position independently of the sensitized element. Another object of the invention is to provide a camera having an individual focusing screen for each exposure. A still further object of the invention is to provide a film roll with focusing screens associated therewith and adapted to be displaced laterally with reference to the length of the film. Another and still further object is to provide improved means for preventing double exposures or blank films.

To these and other ends the invention consists of certain parts and combinations of parts, all of which will be hereinafter described, the novel features being pointed out in the appended claims.

In the drawings:

Fig. 1 is a vertical section through a camera equipped with the present invention, parts being shown in side elevation.

Fig. 2 is a fragmentary perspective view showing the manner in which the viewing hood is used;

Fig. 3 is a perspective view of the camera closed or folded with parts broken away to show the manner in which the pulling tabs of the focusing screens are guided in the camera;

Fig. 4 is a fragmentary perspective view with parts broken away showing another position of a tab;

Fig. 5 is a fragmentary perspective view showing still another position of a tab;

Fig. 6 is a fragmentary view of a photographic shutter showing the manner in which the shutter is operated for focusing;

Fig. 7 is a fragmentary perspective view showing the manner in which the film and the focusing screens operate over the film guides;

Fig. 8 is a fragmentary perspective view of another embodiment in which the focusing screen is mounted independently of the film spool; and Fig. 9 is a view similar to Fig. 8 showing another position of the focusing screen illustrated in Fig. 8.

Referring more particularly to the drawings, 1 indicates a camera casing having a removable back 2 and a bellows chamber 3 providing spool chambers 4 upon opposite sides of the bellows chamber, the inner end of the bellows chamber serving as a guide 3ª for the film and having an exposure opening 5ª provided therein, the guide being spaced from the back 2 so as to provide a passageway for the film 5 and its backing sheet 7 which travel from one of the spools 6 to the other spool in the manner common in roll film cameras. A front plate 8 is hinged at 9 to the casing and is supported preferably by brace arms 10 in order to support a lens carrier 11 which is operable on guides 12 on the inner face of the front plate and is adapted to be received on guides 13 formed on the bottom wall of the bellows chamber 3. The lens carrier 11 carries lens elements and a shutter 15 of any suitable construction. In this instance, the shutter blades 16 are operable by an operating ring 17 which is controlled in a manner well-known in shutters.

One of the features of this invention is the manner in which this operating ring 17 is controlled by an auxiliary operating means for the purpose of focusing the camera. This auxiliary operating means in this instance, comprises a lug 18 struck laterally from the ring and engaged by one arm 19 of a bell crank lever pivoted in the shutter casing to one side of the ring 17. The other arm of this lever is engaged by one end of a wire cable 20 arranged within a sheath 21 and having suitable connection, not shown at its other end with a spring pressed plunger 22 mounted in the base of the lens carrier 11. Pressure upon the plunger 22 shifts the release wire 21 longitudinally, thus effecting the shifting of the bell crank lever 19 to shift the operating ring 17 in order to open the shutter blades independently of the usual operator. The blades are held open as long as pressure is maintained on the plunger 22, but, with the release of the plunger, the cable wire is returned and the shutter blades close under the action of the usual spring (not shown) employed for maintaining the shutter blades closed. This shutter operating mechanism is controlled independently of the ring 17 and permits the latter to be operated by the usual shutter controlling devices in the usual manner.

The lens carrier 11 and the camera casing are connected by a bellows which is formed of two sections, a front section 24 with a large number of folds and a back section 25 with a central fold. From the back section a viewing bellows 26 projects upwardly and this viewing bellows carries near its outer end, a single lens 27 surrounded by a hood 28, said lens being adapted to magnify the image arranged at the exposure opening $5^a$. A shutter 29 is preferably pivotally mounted at 30 and has a spring pressed plunger 31 connected thereto, this plunger being arranged within the hood 28 and being adapted to be engaged by the face of the user in presenting the eye to the hood so that the shutter 29 will be moved to open position as the eye is presented to the lens. The spring 32 operates to close the shutter after the eye is removed from the lens.

In the embodiment of the invention illustrated in Figs. 1 to 7, a roll of film of novel construction is provided. This roll of film has associated with it, a number of focusing screens, these screens being indicated at 33 and each comprising, in this instance, a flexible opaque sheet, with one face formed with a screen or reflecting surface. These screens are arranged end to end on the exposure side of the film with the end edges of adjacent screens slightly overlapping. By this arrangement, the entire sensitized face of the film is covered and the screens are permitted to be displaced laterally of the length of the film. These screen sheets travel over the usual film guides $3^a$ between the latter and the film so that after they are displaced, the film will lie in proper position for exposure.

With the turning of the film in the usual manner, the sensitized element and the screens will travel over the film guide. After the film has been turned a desired amount, the screen will cover the portion to be next exposed and will have its reflecting surface disposed toward the camera lens so that upon the opening of the shutter, the lens may be shifted to properly focus the image upon the screen, the lens 27 being employed for determining the proper focus. After proper focusing, the focusing screen over the exposure opening $5^a$ is displaced laterally so that a picture may now be exposed upon the sensitized surface of the film.

To the end of permitting the lateral displacement of the focusing screens, the camera casing is provided in its back with a slot 35 through which the screens may be pulled after the focusing has taken place. In order that the screens may be pulled through the slot 35, each screen is provided with a tab 36 at one edge, this tab being bent over the backing sheet. In addition the back of the camera is provided with a notch 37 leading from the slot 35 so that the tab may be reached from the back of the camera. So as to facilitate the grasping of this tab 36, the camera back is provided along one edge with a longitudinally extending spring plate 38 which bears against the backing sheet of the film to hold the latter tightly against the guide and has one end tapered at $38^a$ and arranged so as to pass under each tab 36 in order to move such tab outwardly so that when the opening 37 is reached, the tab will spring into a position where it may be readily grasped.

In the embodiment shown in Figs. 8 and 9, the focusing screen moves with the film as the latter is shifted to exposing position as in the embodiment illustrated in Figs. 1 to 7, but instead of being embodied in the film spool, the focusing screen is mounted in the camera independently of the film spool, and instead of employing a number of screens, one for each exposure, only one screen $33^a$ is employed. This screen is mounted on a spring drum 39 and travels from said drum over a guide roller 40, its free end being provided with a reinforcing strip 41 which is held by the spring drum 39 normally in abutment with a stop 42 on the film guide. This reinforcing strip 41 is also provided with two small projections 43 and these projections are adapted to be received in registering slots 44 formed at intervals in the film 5 and its backing sheet 7. When the slots 44 are opposite the projections 43, the walls of such slots will engage with the projections and a movement of the film will cause the focusing screen $33^a$ to travel with the film until the desired amount of film has been moved to exposing position. When this position is reached and after proper focusing of the camera, the film and the backing sheet are moved by devices 45, shown diagrammatically in Fig. 9 and operable from the exterior of the casing, away from the screen so as to free the projections 43, thus permitting the focusing screen to return to its original position against the stop 42 so as to be again shifted when the film is shifted for the next exposure.

In all the illustrated embodiments of the invention, the focusing screen moves with the film over the film guide so that when the desired amount of film has been fed, the portion of the film at the exposure opening will be covered by the focusing screen, thus permitting the focusing of the camera without any further operation of the screen. When the screen is displaced from its position in front of the sensitized sheet, the latter is ready for exposure without any adjustment thereof or of the lens.

In the embodiment shown in Figs. 1 to 7, individual screens are provided for the different exposures. These screens are preferably embodied in the film roll and are adapted for independent displacement laterally of the roll. They move along the film guide with the film and are displaced only after the camera has been focused. They act also to prevent second exposures, for should the user of the camera after examining the same, ascertain that the focusing screen has been removed, then he will be placed on notice that the film probably has been exposed, or if upon examination it is found that the screen has not been removed, then he has notice that an exposure has not been made. This will result in a saving of film by preventing unexposed and double exposed films. The tabs 36 may be provided with numbers to indicate the exposures. The auxiliary shutter operating means permits the operation of the shutter to effect the focusing without interfering with the shutter adjustment. The lens for viewing the image during focusing magnifies the image and is controlled by a shutter which automatically opens upon the presentation of the eye to such viewing lens and automatically closes with the withdrawal of the eye.

While the sheets wrapped with the roll of films are in this instance shown as focusing screens, it is apparent that they have also the function of preventing double exposure and it is desired to protect this feature independently of the use of the sheets as focusing screens.

What I claim as my invention and desire to secure by Letters Patent is:

1. In combination with a roll film camera having a roll film and a guide over which the film travels, the casing of the camera being provided with a slot, and a focusing screen operable between the guide and the film and displaceable through said slot.

2. The combination with a roll film camera having a roll film operating therein, of a focusing screen having a connection with the film to be moved by the latter to focusing position when a portion of the film is moved in front of the exposure aperture, said screen being mounted to move independently of the film after such movement with the film to permit the exposure of the film.

3. The combination with a camera having a sensitized strip for a plurality of exposures, of individual focusing screens for each exposure, each having connection with the film to be moved by the film automatically to focusing position as the portion to be exposed is moved in front of the exposure aperture, each focusing screen being mounted to move independently of the sensitized strip to permit the strip to be exposed.

4. The combination with a roll film camera having a roll film operating therein, of a plurality of separate flexible film covering sheets rolled with the film and so connected thereto as to shift in front of the exposure aperture when the film is shifted to expose different portions thereof, said covering sheets being mounted to be independently displaceable transversely of the film.

5. The combination with a roll film camera having a roll film and a slot in its casing, of a plurality of separate flexible covering sheets rolled with the film and connected thereto to move to a position in front of the exposure aperture when the film is shifted to expose the different portions thereof, said sheets being mounted to be independently displaceable transversely of the film through the slot in the casing.

6. The combination with a roll film camera having a roll film, of a plurality of separate sheets rolled with the film end to end to cover the exposure side of the film and having connection with the film to shift with the latter to exposure position in the camera, said sheets being mounted independently of each other so as to be independently displaceable transversely of the length of the film after being unwound from the roll.

7. The combination with a roll film camera having a roll film, of a plurality of separate sheets rolled with the film end to end to cover the exposure side of the film and having connection with the film to shift with the latter to exposure position in the camera, said sheets being mounted independently of each other so as to be independently displaceable transversely of the length of the film after being unwound from the roll, each of said sheets having a tongue bent on that side of the film opposite that on which the sheet is arranged for the purpose of facilitating the displacement of the sheet.

8. The combination with a roll film camera having a roll film, of a plurality of separate flexible focusing screens rolled with the film end to end so as to be shifted to focusing position when the film is shifted to expose different portions thereof, said sheets being separate from each other and from the film so as to be independently displaceable transversely of the film after focusing position has been reached.

9. The combination with a roll film camera having a roll film and a slot in its casing, of a plurality of separate flexible focusing screens rolled with the film, shiftable to focusing position when the film is shifted to expose the different portions thereof and independently displaceable transversely of the film through the slot in the casing when a focusing screen is in focusing position.

10. The combination with a roll film camera having a roll film and a slot in its casing having one wall notched, of a plurality of separated sheets rolled with the film and connected with such film to shift successively with the film to a position in front of the exposive aperture as the film is shifted to expose different portions thereof, said sheets having tabs adapted to be reached through the notch for the removal of the sheets through the slot.

11. The combination with a camera casing having a removable back provided with a slot and a notch, means for supporting and guiding film in the casing, a spring plate carried by the back to cooperate with the film adjacent said slot, and a roll of film having a backing sheet and a plurality of flexible focusing screens arranged end to end in the roll of film on the face thereof opposed to the backing sheet and having tabs bent over the backing sheet and cooperating with the spring plate as the focusing screens are moved successively to focusing position to be directed by the spring plate to the notch so that the focusing screens may be withdrawn successively through the slot in the casing.

12. The combination with a camera having a sensitized strip movable therein to successively expose different portions thereof, of individual sheets movable with the sensitized strip to maintain the portion of the strip at exposing position covered and shiftable individually to uncover the portion of the sensitized strip at exposing position.

JOSEPH MIHALYI.